United States Patent
Voisin

(12) 
(10) Patent No.: US 6,217,435 B1
(45) Date of Patent: Apr. 17, 2001

(54) PROCESS OF ELIMINATION OF BACTERIA IN SHELLFISH, OF SHUCKING SHELLFISH AND AN APPARATUS THEREFOR

(76) Inventor: Ernest A. Voisin, 412 Palm Ave., Houma, LA (US) 70364

( * ) Notice: Subject to any disclaimer, the term of this patent is extended or adjusted under 35 U.S.C. 154(b) by 0 days.

(21) Appl. No.: 09/457,835

(22) Filed: Dec. 9, 1999

Related U.S. Application Data

(62) Division of application No. 09/121,725, filed on Jul. 25, 1998.
(60) Provisional application No. 60/071,812, filed on Jan. 20, 1998, provisional application No. 60/074,582, filed on Feb. 13, 1998, and provisional application No. 60/086,484, filed on May 26, 1998.

(51) Int. Cl.[7] .................................................. A22C 29/04
(52) U.S. Cl. .................................. 452/12; 452/13; 452/15
(58) Field of Search .................................. 452/20, 18, 12, 452/8, 13, 15

(56) References Cited

U.S. PATENT DOCUMENTS

| | | |
|---|---|---|
| 2,530,783 | 11/1950 | Pogany . |
| 2,648,125 | 8/1953 | McKenna et al. . |
| 3,054,147 | 9/1962 | Archibald . |
| 3,462,797 | 8/1969 | Asbury . |
| 3,471,894 | 10/1969 | Tasker . |
| 3,613,157 | 10/1971 | Landa et al. . |
| 4,383,348 | 5/1983 | Comparetto . |
| 5,213,029 | 5/1993 | Yutaka . |

(List continued on next page.)

FOREIGN PATENT DOCUMENTS

| | | |
|---|---|---|
| 1-001-206 | 8/1989 | (BE) . |
| 2477842 | 9/1981 | (FR) . |
| 360049770 | 3/1985 | (JP) . |
| 63 094955 | 4/1988 | (JP) . |
| 02 257864 | 10/1990 | (JP) . |
| 4356156 | * 9/1992 | (JP) . |
| 04 356146 | 12/1992 | (JP) . |

OTHER PUBLICATIONS

Mermelstein "High–Pressure Processing Begins" Jun. 1998, Foodtechnology, v. 52, No. 6, pp. 104–6, 108.
"Cold Pasteurizer Claims Increased Bacteriologic Safety" Meat & Poultry, Oct. 1997, p. 75.
ABB Pressure Systems AB, "High Pressure Processing New Opportunities in Food Processing".
Pierpaolo Rovere "The Third Dimension in Food Technology" Technologie Alimentari.
ABB Autoclave System "high Pressure Food Processing".
The National Center for Food Safety and Technology "High Pressure Food Processor is Available For Industrial Contract Runs".

(List continued on next page.)

*Primary Examiner*—Willis Little
(74) *Attorney, Agent, or Firm*—Keaty Professional Law Corporation

(57) ABSTRACT

The invention relates to a process for eliminating pathogenic organisms from raw food products, such as raw shellfish, whereby the molluscan shellfish is exposed to hydrostatic pressure of relatively high value, for example between 20,000 p.s.i. to 50,000 p.s.i. for 1–15 minutes. The process is conducted at ambient temperatures, leaving the raw shellfish substantially unaffected, in its desired raw state, such that the pathogenic organisms are destroyed, while sensory characteristics of the raw shellfish remain high. The same process can be used for shucking oysters without any mechanical force. A high pressure processor for elimination of bacteria in raw food products is disclosed.

5 Claims, 3 Drawing Sheets

U.S. PATENT DOCUMENTS

| | | |
|---|---|---|
| 5,288,462 | 2/1994 | Carter et al. . |
| 5,593,714 | 1/1997 | Hirsch . |
| 5,622,678 | 4/1997 | Hiltawsky et al. . |
| 5,639,504 | 6/1997 | Fernandez et al. . |
| 5,679,392 | 10/1997 | Schegan et al. . |
| 5,741,536 | 4/1998 | Mauer et al. . |
| 5,741,538 | 4/1998 | Stipp et al. . |
| 5,741,979 | 4/1998 | Arndt et al. . |
| 5,744,184 | 4/1998 | Kendall et al. . |
| 5,744,188 | 4/1998 | Kolla et al. . |
| 5,773,064 | 6/1998 | Tesvich et al. . |
| 6,033,701 | 3/2000 | Hirsch . |

OTHER PUBLICATIONS

WinSPIRS 2.0, FSTA Abstracts, 1990–1996 (10 pages).

Styles, et al.;"Response of Listeria monocytogenes and *Vibrio parahaemolyticus* to High static Pressure" Journal of Food Service, vol. 56, No. 5., 1991.

Cheftel, J.C., "Effects of high hydrostatic pressure on food constituents: an overview",, High Pressure and Biotechnology, vol. 224, 1992.

O. R. Fennema, "Amino Acids, Peptides and Proteins", Food Chemistry, 3rd Ed.,1996, pp. 361–362, Marcel Dekker.

* cited by examiner

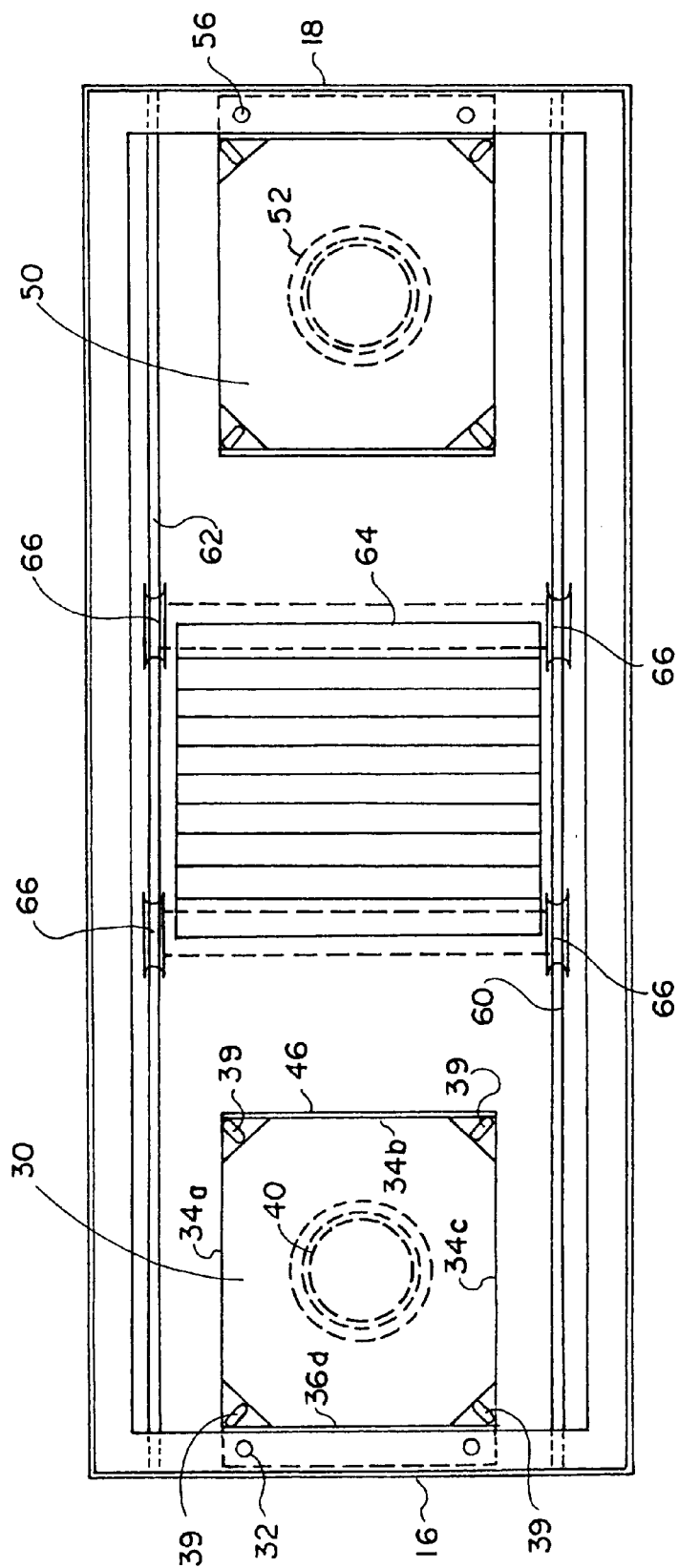
F I G. 2

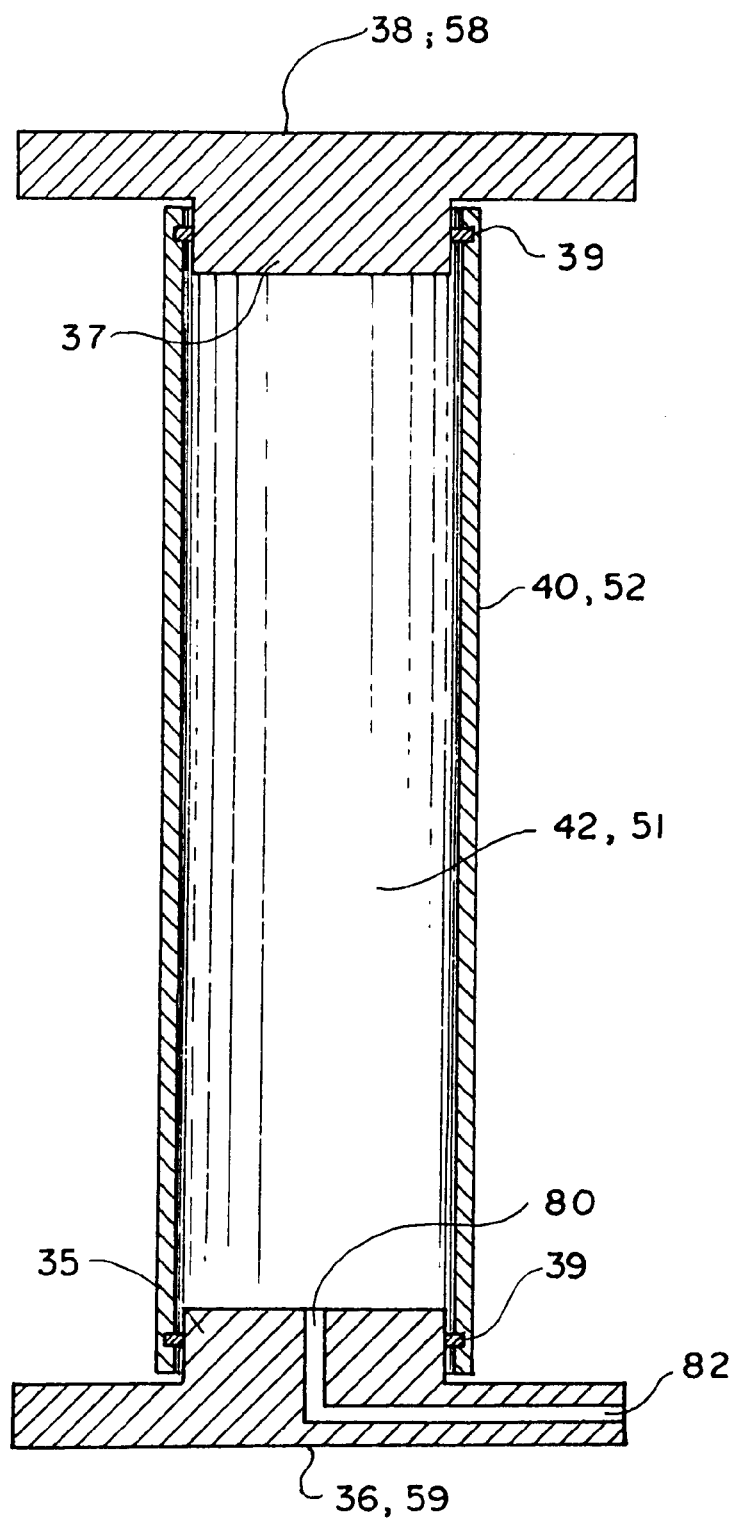
F I G. 3

PROCESS OF ELIMINATION OF BACTERIA IN SHELLFISH, OF SHUCKING SHELLFISH AND AN APPARATUS THEREFOR

IN THE CROSS-REFERENCE TO RELATED APPLICATIONS

This application is a divisional application of my co-pending application Ser. No. 09/121,725 filed Jul. 25, 1998 which is based on my provisional applications Ser. Nos. 60/071,812 filed on Jan. 20, 1998, 60/074,582 filed on Feb. 13, 1998 and 60/086,484 filed on May 26, 1998, the full disclosures of which are incorporated by reference herein.

BACKGROUND OF THE INVENTION

This application relates to a process of treatment of raw molluscan shellfish, and more particularly to a process for destroying bacteria in shellfish, such as for example oysters.

In recent years, considerable attention has been paid in the media to tragic results of consumption of raw oysters where the individuals became infected with life threatening pathogenic organisms. Such bacteria as Vibrio Vulnificus live in marine environment, especially in warm waters, usually higher than 25° C.

Vibrio Vulnificus has been isolated from estuarine and marine waters of the U.S. Gulf Coast, east coast, and west coast; it was also reported on other continents. The bacteria may transfer from water to the shellfish inhabiting the body of water, especially filter-feeding mollusks, where bacteria can multiply mostly in the gut region.

Vibrio is a genus of motile curved and rod-shaped Gram-negative bacteria. Other well-known vibriones are Vibrio cholerae and Vibrio Parahaemolyticus. Vibrio Parahaemolyticus is a common cause of gastroenteritis in some cultures, where consumption of food is particularly high, such as for example Japan.

Vibrio Vuilificus is a halophilic species, the strains of which are similar to Vibrio Parahaemolyticus and Vibrio alginolyticus. Vibrio Vulnificus thrives in warm waters. Ingesting uncooked or undercooked shellfish that contain vibrios, especially oysters, transmits it. After a brief incubation period, often as short as two hours, Vibrio Vulnificus causes septicemia and cellulitis. Physical symptoms include indigestion, cramps, nausea, vomiting, headache, weakness, fever and chills.

Usually, this food poisoning subsides spontaneously within two days. Occasionally, however, it is more severe. Persons with pre-existing hepatic disease or compromised immune system are especially ill danger. Infection may occur not only through digestion of raw seafood but also from wound infection following exposure to seawater.

While fatal outcomes are extremely rare, the unfortunate events have been widely publicized, making the public aware of a potential life threatening exposure to the Vibriones. The fear of the bacteria poisoning is so high that the federal government issued a special warning advising the public of the potential dangers of raw oyster consumption. It has also been suggested that no harvesting of oysters be conducted during warm months in the Gulf of Mexico, so as to minimize the health risk associated with such food poisoning.

Public fear of the potential dangers associated with bacteria poisoning through raw oyster consumption adversely affected an important Louisiana industry—oyster harvesting. Market share of Gulf oysters shrunk, and many fishermen found that even oysters harvested from safe beds are not in such a great demand as they used to be and that the price has fallen drastically.

Still, consumption of raw molluscan shellfish is so widespread in the South that many restaurants continue to catiy raw oysters as part of their menu. Even though many restaurants post a warning sign of the possible danger to a segment of the public with liver or immune system disorders it rarely stops dedicated gourmands.

To prevent poisonous consumption of pathogenic organisms, various methods have been suggested for treating raw shellfish, for example with heat or irradiation, in an effort to eliminate or minimize the public health danger. For example, U.S. Pat. No. 5,679,392 (the '392 patent) issued on Oct. 21, 1997 for "Heat Treatment of Raw Molluscan Shellfish" discloses a method for preparing raw molluscan shellfish in the shell or out of the shell employing a mild heat treatment and cold storage.

According to the '392 patent, the shellfish placed in a polymer or metallized bag is lowered into a circulating bath of water at a temperature of between 120° F.–130° F. for 30–45 minutes, after which time it is cooled in a cold water bath to a temperature between 28° F.–32° F. The product is then transferred to a cool water bath, where it is retained for 15–20 minutes and becomes ready for storage in a refrigerated state at 32° F.–34° F. The patent disclosure asserts that the mollusk remains in a raw state and in the shell throughout the process, while the number of pathogenic bacteria is reduced to an undetectable level.

While this process may be satisfactory for some products, it is believed that heating of the shellfish will affect the sensory qualities of the product, making it less desirable for consumption as raw shellfish. Heat treatment as a means of controlling microorganisms and bacteria in food products results in diminished taste and reduced nutritional content. Therefore, elevated temperatures are considered unsatisfactory for processing of raw oysters where the purpose of the process is to retain sensory qualities of oysters and sell them on a half-shell.

Ionizing irradiation was tested as one of the methods of destroying harmful bacteria in live shellfish. However, this process is relatively expensive and has not yet obtained approval by the Federal Food and Drug Administration. Other known attempts to purify raw oysters involve depuration, wherein oysters are soaked in a tank of water for days at a time in an attempt to purge and cleanse the mollusk of the bacteria. So far, there have been no reports on the success of this method in destruction of bacteria in raw oysters.

Other suggested methods of destroying Vibrio Vuinificus involve cold, freezing, vacuum packaging, use of GRAS (diacetyl) compounds, suspension relaying into offshore water, and food condiment treatment. While some of these methods are relatively simple to implement, most of them have problems—either too expensive, ineffective, time consuming, or failed to receive FDA approval.

It was also suggested to refrigerate oysters immediately after harvesting at 7.2° C. or less in an attempt to control multiplication of bacteria. However, cold treatment greatly reduces but does not eliminate bacteria present in oysters during harvesting for a storage period considered normal for shucked or shell stock oysters.

Heat treatment, for example at 50° C. for 10 minutes, kills the bacteria; this method is currently used on a commercial scale for live shell stock oysters. However, this method also kills the oysters. Additional drawback of this method is that it is difficult to control the temperature of commercial size batches when the size and shell thickness of oysters differ from batch to batch.

Vacuum packaging combined with freezing tends to reduce the level of Vibrio Vuinificus. However, this method is relatively expensive, reduces quality, so that the product treated in this manner may not find a wide acceptance with the public. When diacetyl, an FDA approved preservative was used on raw oysters, at levels of 0.05% or greater, it demonstrated decrease in the level of the bacteria, but did not guarantee complete elimination thereof.

When oysters were relayed into high salinity environment of offshore waters, Vibrio Vulnificus bacteria were reported to decrease to a level found in oysters normally harvested in more cold months, where no reported cases of food poisoning were recorded. However, oyster predators and parasites are a factor with this very expensive method. The use of UV light and micro-filtration treatment of seawater did not depurate the bacteria from oyster tissue.

Some studies examined the effect of Tabasco sauce on freshly shucked oysters. In about ten minutes, the level of Vibrio Vulnificus on the surface of tested oysters was significantly reduced, but the levels of the bacteria within the oyster meat remained almost unaffected.

In recent years, a new technology has emerged—high pressure processing of foods. The leading manufacturer of high-pressure food processors is ABB Pressure Systems AB of Vasteras, Sweden and its affiliate, ABB Autoclave Systems, Inc. of Columbus, Ohio. According to industry sources, this company makes equipment for processing of juices, fruits, vegetables, fruit-based beverages, jams, sauces, soups and meats. The company'literature claims that most bacteria in food can be killed by pressures in the range of 400–800 MPa (58,000 p.s.i.–116,000 p.s.i.).

A Canadian company, GEC ALSTHOM, developed a cold pasteurizing system, which utilizes high hydrostatic pressure for processing thermal-sensitive packaged food products. According to that company'literature, pressure modifies cell membrane permeability of microorganisms. As a result, bacteria are inactivated or die. It is recommended that the treated products are kept chilled at 4° C. in order to reduce bacteriologic risk. The process is said to triple shelf life of the products.

Other companies in Europe and the United States continue research in the high-pressure food processing area.

High pressure is said to be preferable to heat treatment because high pressure does not destroy many of the substances found in fresh foods, such as vitamins, chlorophyll and aroma substances. As a result, refrigerated shelf life of fruit and vegetable products, as well as high-acid products can be increased from several weeks to several months. Most importantly for the purposes of the present invention, high pressure treatment is believed to increase food safety by reducing bacteria in the processed products, while retaining the products' nutritional value, color, flavor and texture.

The principle of cold isostatic (uniformly applied) pressure processing is relatively simple—food is placed in a container and is surrounded by a pressure medium, usually water. An external pressure intensifier to a predetermined value pressurizes the vessel. Pressure is fed into the pressure vessel where food products have been deposited. Pressure in such a vessel is distributed evenly through all parts of the product, thereby preventing mechanical damage of delicate food products. The process may be conducted with no or minimal heat treatment.

Another problem that the present invention addresses is mechanical shucking of oysters. Seafood processing plants employ skillful workers for the preparation of oysters for packaging in jars and other containers for sale to the customers. Restaurants that serve raw oysters also employ special personnel for shucking oysters before serving the delicacy on a half shell.

The process of oyster shucking involves cutting of the connective tissue of oyster adductor muscle that is normally attached to the shell and keeps the shell halves tightly closed. More experienced workers perform this task relatively well, while novices can damage the product and cut through the body of the oyster, thereby reducing the quality and increasing the cost.

At present, the applicant is not aware of any commercial utilized method of mechanical shucking of oysters. It is estimated that about 80% of the cost of a shucked oyster are due to the labor-intensive hand-shucking process.

The present invention contemplates elimination of drawbacks associated with the prior art and reduction or elimination of harmful bacteria in raw shellfish, as well as shucking of oysters without any substantial affect on the sensory qualities of raw shellfish. Additionally, a new method of fabricating the yoke and chamber of high pressure equipment is disclosed.

SUMMARY OF THE INVENTION

It is, therefore, an object of the present invention to provide a process for reducing or elimination of pathogenic organisms from raw molluscan shellfish, such as oysters, clams, and mussels.

It is another object of the present invention to provide a method of reducing harmful bacteria in raw shellfish without substantially affecting its sensory qualities.

A further object of the present invention is to provide a method of shucking oysters and other shellfish such as clams and mussels that does not involve manual cutting of the oyster muscle.

Still another object of the present invention is to provide an apparatus for high pressure processing of shellfish, such as oysters, clams and mussels.

These and other objects of the present invention are achieved through a provision of a process that includes high-pressure treatment of raw shellfish, the process comprising the step of exposing the shellfish to relatively high hydrostatic pressure. The process is conducted at ambient temperatures, exposing the molluscan shellfish to the liquid pressure of between 20,000 p.s.i. to 80,000 p.s.i. for 1–15 minutes.

As a result of the high-pressure treatment, pathogenic organisms, such as bacteria Vibrio Vulnificus are destroyed without substantially adversely affecting the sensory qualities of the shellfish. At the same time, the connective tissues of oyster adductor muscle holding the two oyster shell halves is separated from the shells, and the oyster shells open without any manual cutting of the muscle.

BRIEF DESCRIPTION OF THE DRAWINGS

Reference will now be made to the drawings, wherein like parts are designated by like numerals, and wherein

FIG. 2 is a top view of the processor shown in FIG. 1; and

FIG. 3 is detail cross sectional view of the inner liner with top and bottom lids and pressure containing seals.

DETAILED DESCRIPTION OF THE PREFERRED EMBODIMENT

Figure 1:
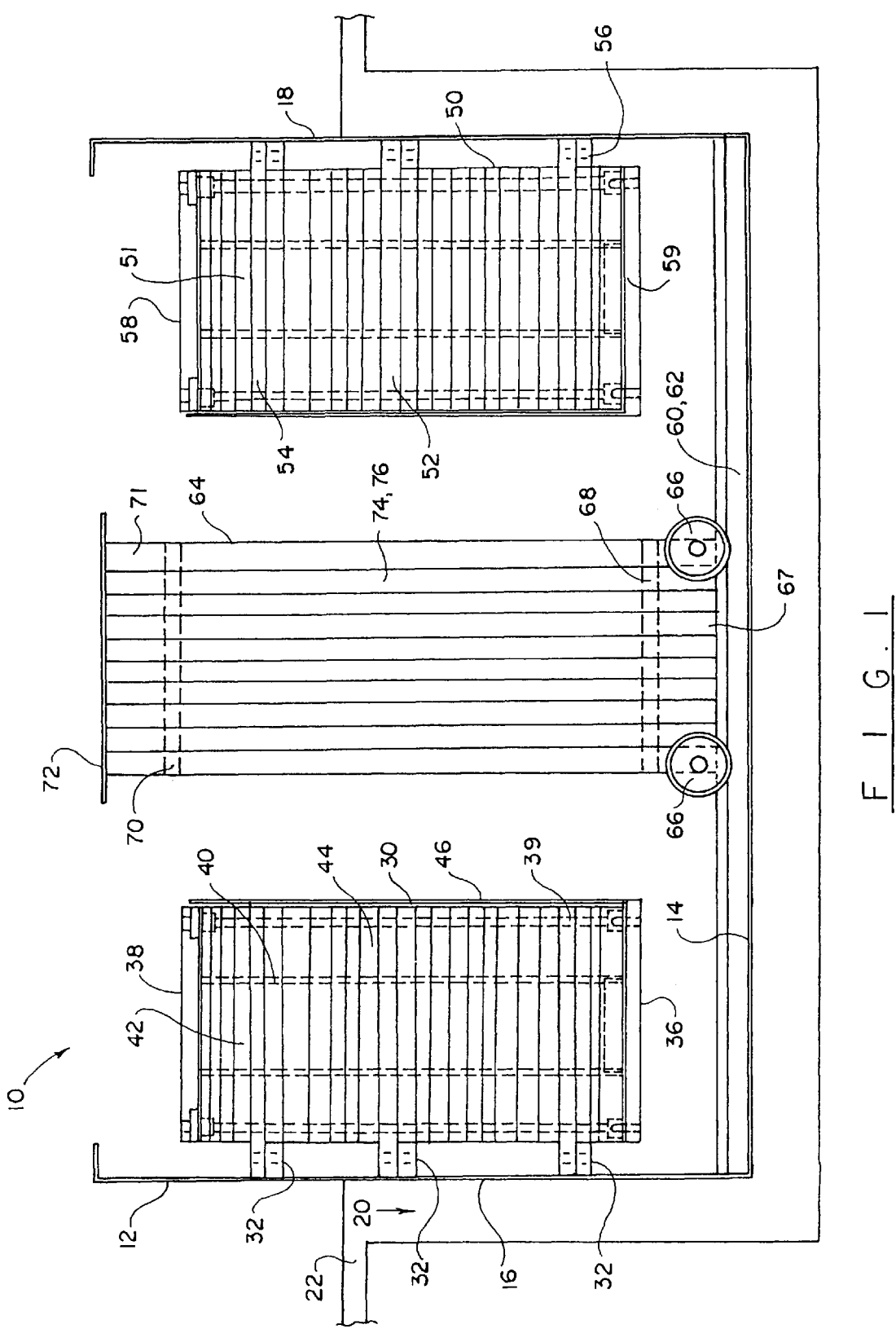
FIG. 1 is a schematic side view of high pressure processor for practicing the process of the present invention.

The new process for the treatment of raw molluscan shellfish according to the present invention will now be described in more detail. According to this process, raw shellfish, such as oysters, clams and mussels are treated in a high-pressure environment with no application of heat, at substantially ambient temperatures.

The non-thermal method of food preservation, high pressure processing, has been known in use in relation to meat product, fruits, and other products. However, no attempts have been known so far to treat such fragile, easily damaged products as raw shellfish. Traditionally, shellfish, such as crab, crawfish and oyster deteriorate in quality immediately upon death. For this reason, they are usually shipped either live, at considerable expense in refrigerated containers, or fresh frozen.

None of these approaches could be applied to insure bacteria-free raw shellfish that would satisfy public demand for raw oysters eaten on a half shell. Bearing in mind the importance of regaining markets and consumer confidence in Gulf oysters, fishermen are looking for feasible methods of processing shellfish without destroying its nutritional and sensory values.

According to the present invention, molluscan shellfish, for example, shellstock oysters, are individually tied with a flexible band, for example a rubber band, and placed in a pressure vessel that contains a pressure transmitting fluid, for example, water. If desired, the shellfish can be prepackaged in pouches and then loaded into the pressure vessel. The vessel is then closed and pressurized to between about 20,000 p.s.i to 50,000 p.s.i. for 1–15 minutes.

During experimental tests, it was observed that the higher the pressure, the less time it takes to destroy bacteria, such as Vibrio Vulnificus in raw oysters. For example, when shellstock oysters were treated at hydrostatic pressure of 50,000 p.s.i. for 5 minutes, seeded bacteria Vibrio Vulnificus was reduced from 24,000 MPN/g to 0 MPN/g (here, MPN stands for Most Probable Number).

During processing, the pressurized liquid remained at ambient temperature while the pressure was transmitted uniformly to the product inside the pressure vessel. The resultant product did not significantly change in volume and no mechanical damage was observed to the delicate food product.

During experimental tests, it was determined that treatment of the product at hydrostatic pressure of 50,000 p.s.i. for 5 minutes achieved the desired result with all of the treated shellfish. It is envisioned, however, that under certain conditions, the shellfish can be treated at even higher or lower pressures. The increase in temperature during the treatment was minimal, about 3° C. per 14,500 p.s.i.; it did not depend on the size of the processed product. The temperature decreased as soon as the pressure application was terminated.

Some experiments showed that preferred pressures are in the range of 45,000 p.s.i., as pressures lower than 45,000 p.s.i. could lead to reversible denaturing of the treated product, and thereby adversely not achieve the desired results.

It is further envisioned that other types of bacteria, in addition to Vibrio Vulnificus can be eliminated or substantially reduced in raw shellfish with the use of the present invention, therefore increasing the shelf life of a product.

During experiments with raw oysters, an unexpected phenomenon was observed—the oyster adductor muscle connective tissue attachment at the shell denatured to gel formation at pressure as low as 20,000 p.s.i. and treatment time of 15 minutes. First, it as observed that a gap developed between the shell halves. When the shell halves were pried open, the oyster easily slid out of the shell in perfect condition. No mechanical cutting was necessary. The denaturing of muscle proteins, including actin and myosin and connective tissues to a gelatin transition is a result of disruption of non-covalent interactions in tertiary protein structures. The potential commercial utilization of this chemical denaturing for mechanical shucking of live shell stock oysters has not been previously tested or observed.

To prevent escape of water or "bleeding" of oysters during the high pressure treatment, oysters need to be mechanically banded, for example with a flexible band, such as a rubber band, before placement in the processing vessel. The band keeps the shell halves tightly closed, thereby helping in preservation of natural condition of raw oysters that can be later served on a half shell. The processed oysters can be shipped to customers with the bands attached, and the consumer will then only need to remove the band to open the oysters. Oysters that will be immediately shucked do not need to be banded.

Turning now to the drawings in more detail, numeral 10 designates a high-pressure processor used in the present invention. The processor 10 comprises an enclosure 12 made of steel or stainless steel. The enclosure 12 has a bottom plate 14 and four vertical sidewalls (only two opposing sidewalls 16 and 18 are shown in FIG. 1).

The enclosure 12 can be mounted in a cavity 20 formed below a floor level 22. Concrete walls reinforced with rebars, if necessary can define the cavity 20. The walls and floor defining the cavity 20 may be 12" or more in thickness. At the least a lower portion of the enclosure 12 is housed within the cavity 20.

A first pressure vessel 30 is secured on the wall 16 of the enclosure 12 by attachment brackets 32. The brackets 32 are vertically spaced from each other and can be three or more in number. The vessel 30 has vertical walls 34a, 34b, 34c, and 34d (see FIG. 2), a bottom lid 36 and a top lid 38 with four vertical corner bars 39 (FIG. 2).

A continuous cylindrical liner 40 is mounted inside the vessel 30, the liner 40 extending from a level adjacent the bottom lid 36 to the upper edge of the vessel 30. The liner 40 defines a pressure chamber 42 inside the vessel 30. Horizontal slabs 44 surround the vertical liner 40, and a safety plate 46 is secured on the exterior of the vessel 30, extending along the wall 34b, as can be better seen in FIG. 2. The slabs 44 can be made of high tensile steel or other high-tensile material to help contain the high pressure created in the chamber 42. The top lid 38 and the bottom lid 36 have central portions, 37 and 35, respectively, that extend into the cylindrical liner 40, as can be better seen in FIG. 3. Pressure containing seals 39 are positioned in a circumferential relationship about the portions 35 and 37 between the liner 40 and the central portions 35, 37.

A second pressure vessel 50 is securely attached on the opposite wall 18. The second pressure vessel 50 is similar to the first pressure vessel 30 in all respects, as it comprises a cylindrical inner liner 52 surrounded by a high-tensile "envelope" 54 placed in the vessel 50. The envelope 54, similar to the slabs 44 can be made of a plurality of smaller high tensile steel slabs. A plurality of attachment brackets 56 secures the vessel 50 on the wall 18. A top lid 58 covers the open top of the vessel 50 and a bottom lid 59 covers the bottom of the vessel 50. The top lid 58 and the bottom lid 59 have central portions, similar to portions 35, 37 of the vessel 30, that extend into the liner 52 where the pressure containing seals 39 are located.

Each bottom lid 36 and 59 is provided with inlet/outlet opening to allow pressure medium fluid to move in and out of the pressure chamber 42 and 51. As can be seen in FIG. 3, the central portion 35 of the lid 36 has a central fluid channel 80 that extends to about midway of the lid 36.

A second channel 82 fluidly communicates with the first channel 80 to allow egress and ingress of pressure fluid. The second channel 82 is formed at about a right angle to the first channel 80 extending from the center of the lid 36 in a parallel relationship to the general plane of the lid 36 and in a transverse relationship to a vertical axis of the liner 40. The channels 80 and 82 connect the interior of the pressure chamber 42 with an exterior thereof. The lid 59 of the pressure vessel 50 is provided with an identical inlet/outlet port connecting the pressure chamber 51 with an exterior thereof.

Extending between the opposing walls 16 and 18 is a pair of rails 60, 62. A pressure holding and safety yoke 64 slides on the rails between the first pressure vessel 30 and the second pressure vessel 50. The yoke 64 is mounted on wheels 66, which are secured at bottom corners of the yoke frame. A bottom plate 68 is secured above a bottom part 67 of the yoke 64, and a top plate 70 is secured below a top part 71 of the yoke 64. The space between the upper plate 70 and the bottom plate 68 is large enough to accommodate the pressure vessel 30 or 50. The purpose of the bottom plate 68 and the top plate 70 is to provide extra strength to the yoke 64.

The yoke 64 further comprises two vertical walls 74 and 76 secured in parallel relationship between the upper part 71 and the bottom part 67 of the yoke 64. As a result, a rectangular frame structure is defined by the yoke walls, bottom and upper parts. In use, the yoke 64 surrounds the pressure vessel 30 or 50 on opposite, unprotected walls 34a and 34c and provides extra protection when high pressure is applied. The primary function of the yoke 64 is to hold the lids 58 and 59 of the vessel 50 and the lids 36, 38 of the vessel 30 in place when high pressure is applied.

The top plate 70 covers the lids 38,58, while the bottom plate 68 extends below the bottom lids 36 and 59 of the vessels 30 and 50, respectively. The yoke walls 74 and 76 and the upper part 71 and the bottom part 67 can be formed from a plurality of high tensile slabs secured together by four bolts. A top safety shield 72 provides extra protection during operation.

In operation, raw shellfish, such as an oyster is individually banded to prevent escape of water from the shell when the oyster is removed from the chamber. The oysters are placed in a basket for handing purposes. Oysters can also be placed in flexible bag filled with water prior to being inserted into the pressure chambers of vessels 30 and 50. The pressure chamber is filled with pressure medium, such as water. The basket is then inserted into the pressure chamber of a vessel 30 or 50, and the lids 38, or 58, respectively, are closed. The yoke 64 is rolled toward the loaded vessel and secured in place by a conventional stop to assure positioning during a high-pressure application.

An external pressure source is used for supplying pressure to the pressure chamber of the vessel, where the oysters have been deposited. According to Pascal's Law, this hydrostatic pressure has a uniform effect on all materials inside the pressure vessel. Equally distributed pressure affects the oyster meat inside the shells and eliminates Vibrio Vulnificus bacteria from the oyster meat without any mechanical damage to raw oysters.

Oyster meat has a high water content, which makes high-pressure treatment a particularly advantageous type of processing for raw oysters. At the same time, the adductor muscle detaches from the shell, and shell halves are ready to separate, when necessary, for serving oysters on half shelf, or for easy shucking of oysters.

While the oysters are processed, the pressure in the chambers 42 or 51 is rapidly elevated to between 20,000 p.s.i. and 50,000 p.s.i. The pressure is retained for about one to fifteen minutes, depending on the selected pressure value. For lower pressures, the time of treatment is greater, while higher pressure requires less treatment time. The pathogenic microorganisms are eliminated, while nutritional value and sensory qualities of raw oysters are not affected.

Experiments conducted with raw oysters demonstrated that Vibrio Vulnificus bacteria were eliminated at every test run with any size oysters when pressure was in the range of 45,000 p.s.i. and treatment time was about 5 minutes. Shucking of oysters occurs at much lower pressures, about 20,000 p.s.i., when oysters are treated for 15 minutes. Therefore, it is envisioned that for processes not requiring bacteria elimination, but only shucking, the vessels 30 and 50 can be run at lower pressures.

Once the batch in the loaded vessel has been treated for the pre-determined period of time, the yoke 64 is rolled away from that vessel and engaged with the second vessel. While the product is processed in the second vessel 50, the treated product from the first vessel 30 can be unloaded, and a new batch of products deposited therein. The single yoke 64 serves as a pressure holding and safety device for two separate pressure vessels 30 and 50.

The method in accordance with the present invention does not cause thermal damage, as the process is conducted at ambient temperatures. At the same time, no mechanical damage to the delicate oyster meat occurs, as the shell protects the oyster from any contact with the mechanical parts of the pressure vessels.

The method of the present invention has minimal impact on the environment. Cooling water can be recycled through the use of conventional equipment. Conventional electro-mechanical systems can be used to generate high pressure inside the pressure vessels 30 and 50.

It is envisioned that various types of molluscan shellfish, such as clams, muscles, abalone, and others can be processed with the method of the present invention without mechanical damage or deterioration of sensory properties of the product. Once the bacteria are eliminated, the product can be shipped for consumption in a raw state. It is believed that the process of the present invention can be implemented for elimination of other bacteria, in addition to Vibrio Vuinificus.

The shellfish can be harvested even in warm months, and the public will be assured of the product safety. Naturally contaminated Gulf Coast oysters that can contain thousands of harmful Vibrio Vulnificus bacteria can be successfully processed with the apparatus and method of the present invention.

Other seafood items can be similarly processed with the method and apparatus of the present invention. If desired, oysters and other products to be treated in the system of the present invention can be placed in baskets in a refrigerator/cooler, so as to prevent bacteria multiplication, while the products wait their turn in the pressure vessels. After processing, the shellfish should be placed in a cooler as soon as possible. The processed shellfish should be preferably kept at between 32° F. and 36° F. until it is sold and consumed by a customer.

The external source of pressure can be any conventional pressurizing means, such as hydraulic motor, electrical motor and the like. Other means for building up pressure in the pressure chambers can be successfully employed without affecting the advantages afforded through the practice of the present invention.

Many changes and modifications can be made in the process of this invention without departing from the spirit thereof. I, therefore, pray that my rights to this invention be limited only by the scope of the appended claims.

What is claimed is:

1. A method of shucking a raw oyster, comprising the steps of:

exposing said oyster to hydrostatic pressure of at least 20,000 p.s.i. for 15 minutes to cause detachment of an adductor muscle from a shell of said oyster and opening of the oyster shell.

2. The method of claim 1, wherein said oyster is exposed to hydrostatic pressure of between 20,000 p.s.i. and 50,000 p.s.i. for a period of 1–15 minutes.

3. The process of claim 1, wherein a flexible detachable band is wrapped around said molluscan shell prior to exposing said molluscan shellfish to hydrostatic pressure.

4. A process of shucking oysters, comprising the steps of:

wrapping a flexible detachable band around individual oysters;

positioning said oysters in a pressure vessel;

applying hydrostatic pressure to said oysters of between 20,000 p.s.i. and 50,000 p.s.i. in the pressure vessel for a time of 1–15 minutes sufficient to cause detachment of an adductor muscle from shells of said oysters;

removing said bands from said oysters and opening said oysters without cutting said adductor muscles.

5. The process of claim 4, wherein said molluscan shellfish positioned in flexible liquid-impermeable bags filled with pressurizable liquid prior to exposing said oysters to hydrostatic pressure.

* * * * *